Sept. 11, 1956 H. K. BAKER 2,762,238
HYDRAULIC TORQUE CONVERTER TRANSMISSION
Filed Oct. 17, 1950 5 Sheets-Sheet 3
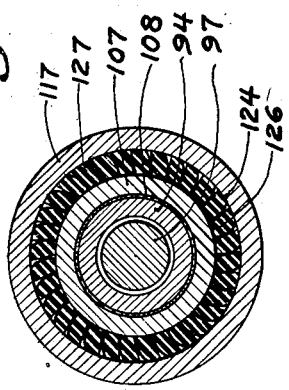
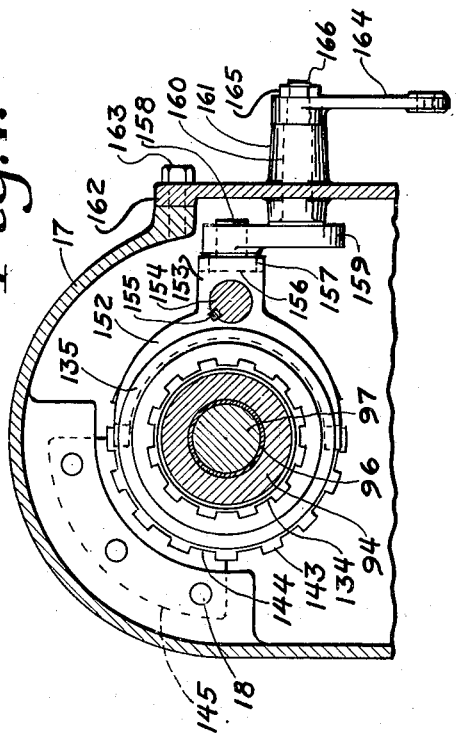
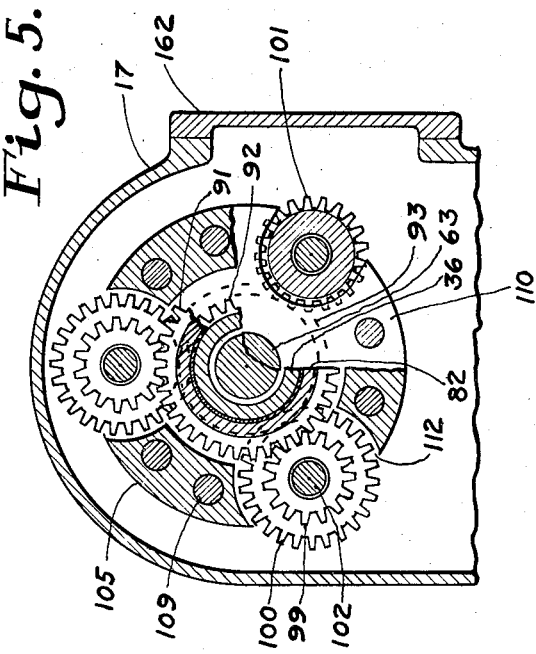
INVENTOR.
HERBERT K. BAKER
BY
Arthur M. Smith
ATTORNEY Sept. 11, 1956   H. K. BAKER   2,762,238
HYDRAULIC TORQUE CONVERTER TRANSMISSION
Filed Oct. 17, 1950   5 Sheets-Sheet 4
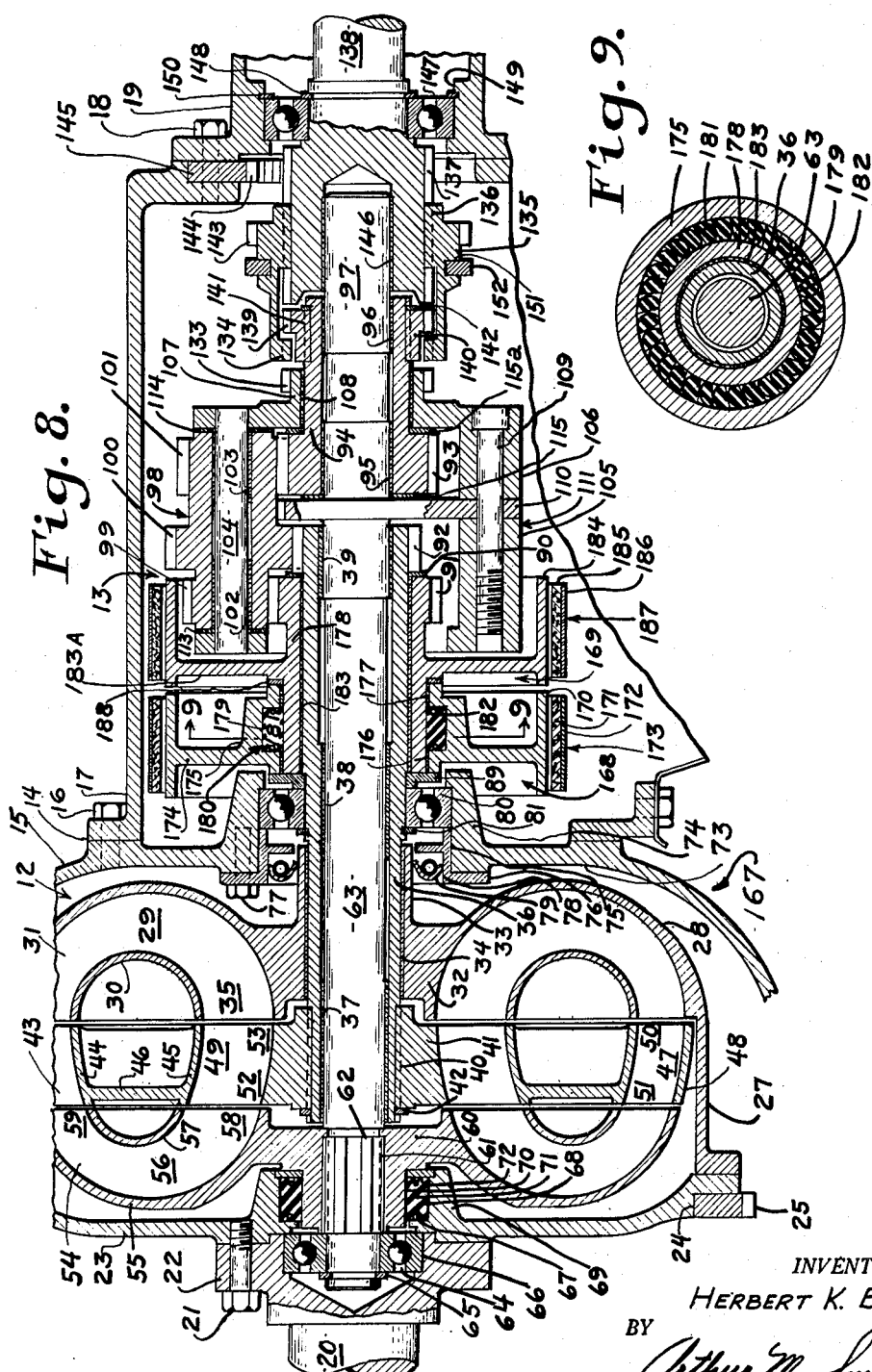
INVENTOR.
HERBERT K. BAKER
BY
Arthur M. Smith
ATTORNEY

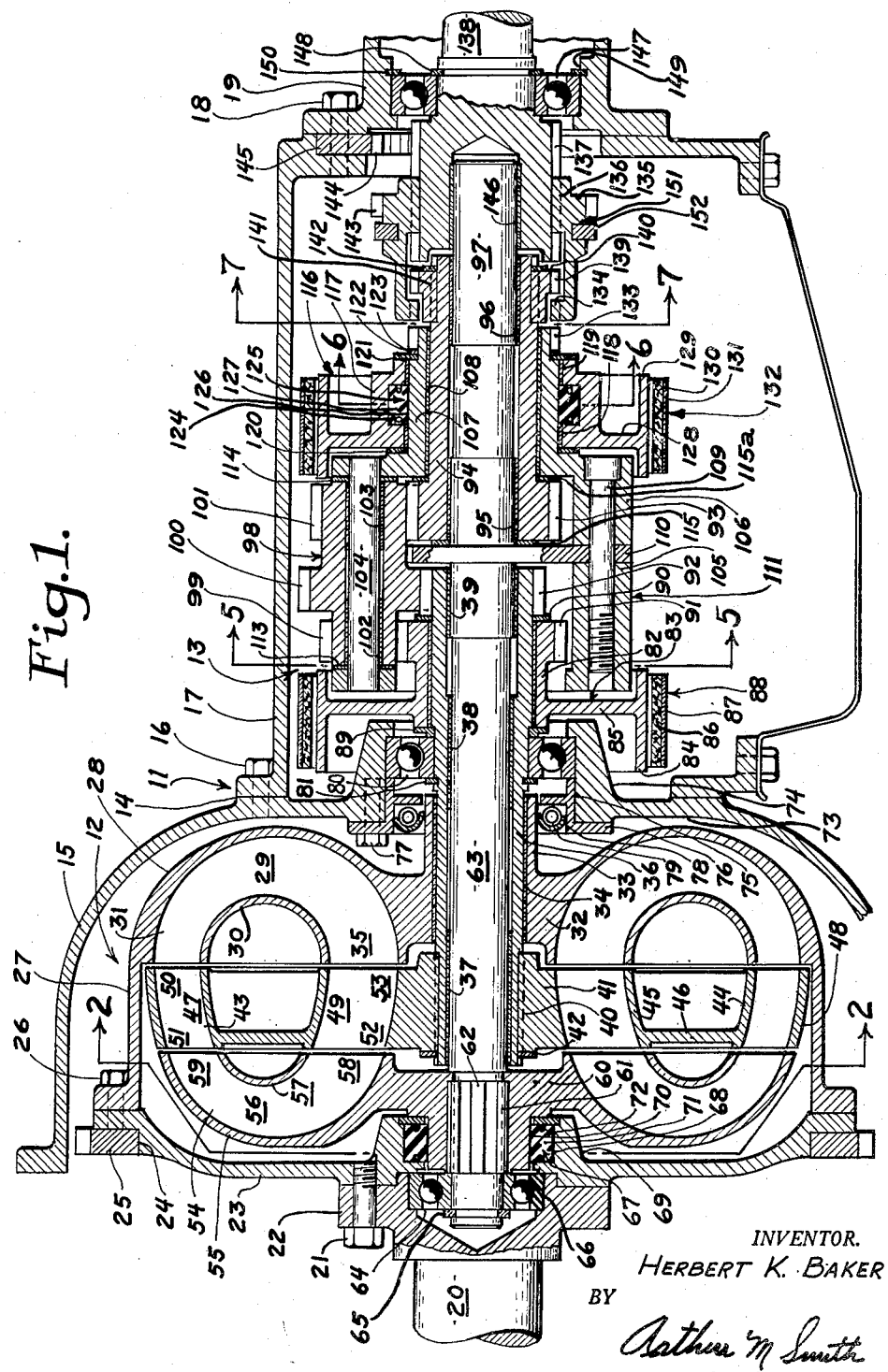

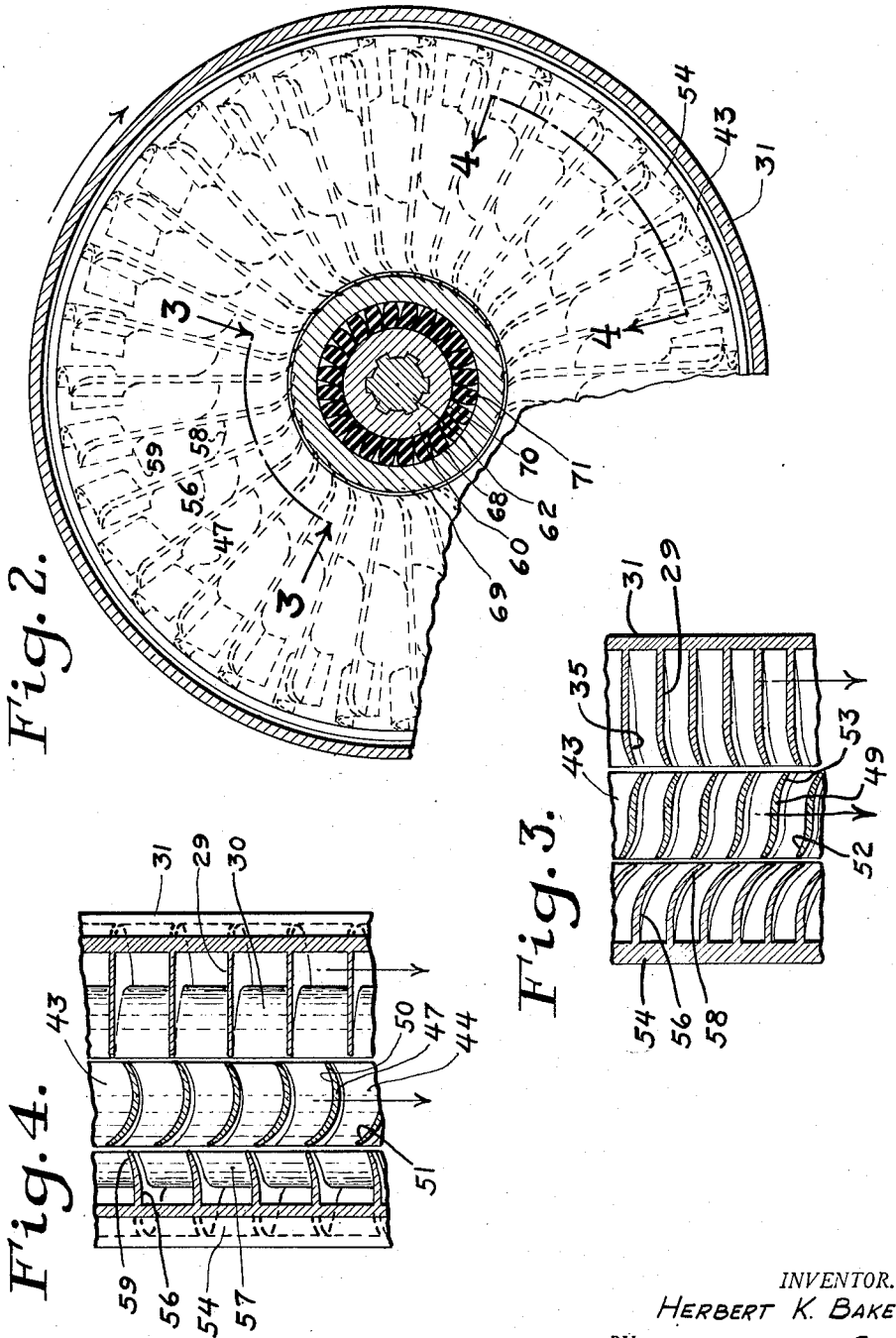

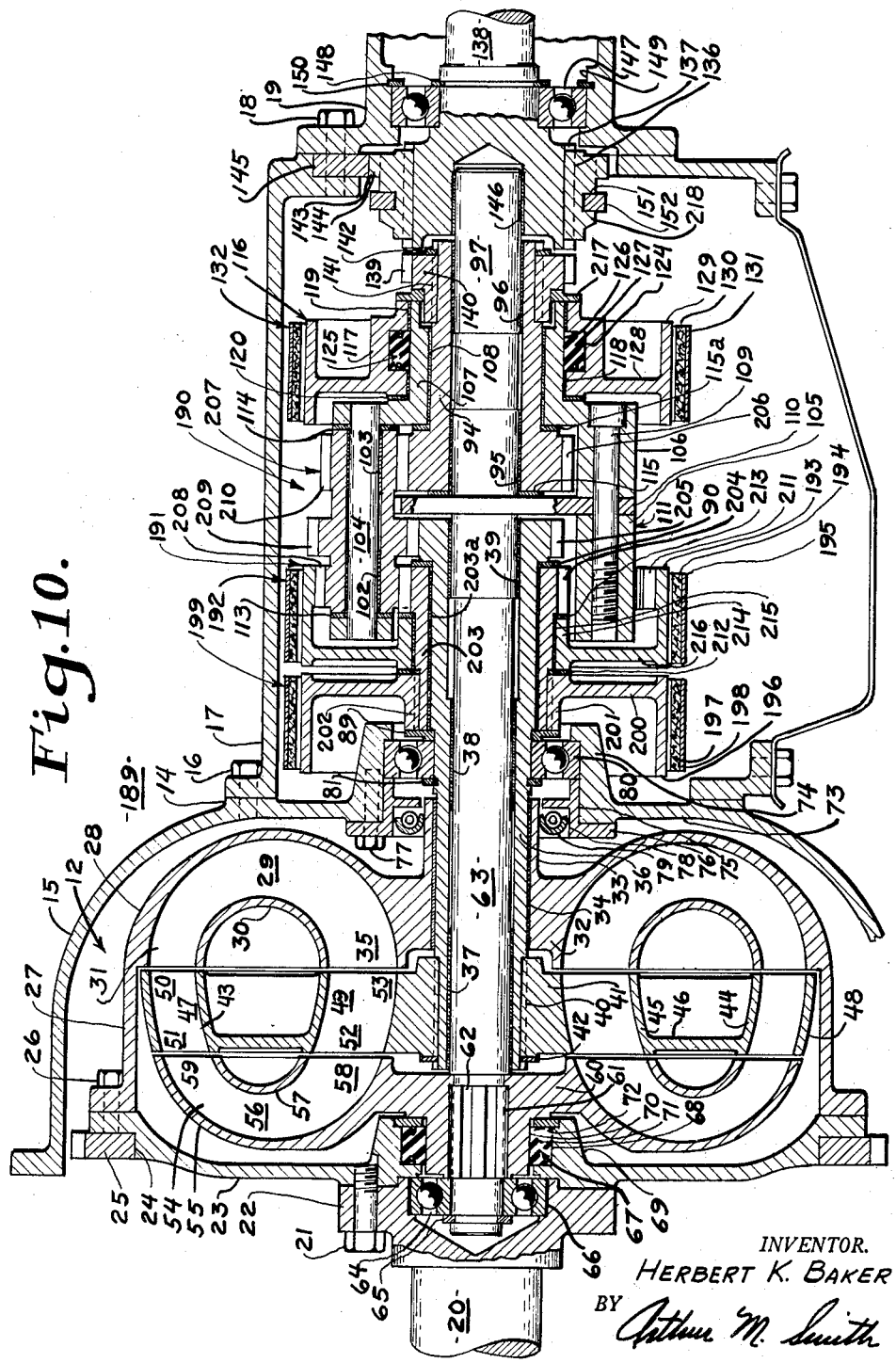

United States Patent Office 2,762,238
Patented Sept. 11, 1956

2,762,238

HYDRAULIC TORQUE CONVERTER TRANSMISSION

Herbert K. Baker, Detroit, Mich., assignor of twenty-four per cent to Harriett V. Baker and twenty-four per cent to Herbert K. Baker, Jr., Wayne County, Mich.

Application October 17, 1950, Serial No. 190,471

5 Claims. (Cl. 74—677)

This invention relates to variable speed transmissions and, in particular to hydraulic torque converter transmissions. This application is a continuation-in-part of my prior application, Serial No. 70,163, filed January 11, 1949.

Such conventional transmissions include a hydraulic torque converter comprising vaned rotor members, namely, an impeller, a turbine or runner and guide wheel mounted to act particularly as a reaction member with the vanes thereof formed to deflect directionally the motive fluid passing from the vanes of the runner while in predominately crosswise or vortex flow during the operating phase of torque multiplication. This action tends to rotate the guide wheel reversely or counterclockwise, relative to the forward or clockwise rotation of the runner, but is prevented from doing so by the usual provision of a unidirectional braking device which, however, permits the guide wheel to free wheel in a forward or clockwise direction under changing action of the fluid stream as torque multiplication diminishes to the extent where the runner approaches the speed of the impeller, consequently, causing the fluid stream to then predominately rotate in a direction with the rotating impeller, this latter action is commonly called "rotary flow."

A particular object of the present invention is to provide greater flexibility and improve operating characteristics of hydraulic torque converter transmissions by a unique arrangement of the elements wherein the guide wheel is made adaptable to function as a normal guide reaction rotor member and as a secondary runner rotor mounted for both clockwise and counterclockwise rotation in a manner for transmitting a portion of the driving force, exerted on the motive fluid by the impeller, to a planetary gear set arranged for coactingly combining this force portion transmitted thereto with the force transmitted by a primary runner mounted for clockwise rotation irrespective of the direction the combination guide and secondary runner rotor is caused to rotate.

Another important object is to provide a hydraulic torque converter transmission of the foregoing character to include provision for several operating functions from a simplified arrangement of the elements wherein the planetary gear set is provided with an input sun gear, an output sun gear together with an idling sun gear and planet pinions meshing with these sun gears including means to halt the idling sun gear for the particular planet pinions meshing therewith to be drivingly rolled around this halted sun gear for causing the planet pinion carrier to rotate reversely or counterclockwise to provide reverse drive or, through the planetary action resulting thereby, a large speed reduction ratio from the input sun gear to the output sun gear for utilizing in a phase of forward drive operation and additionally providing with the same arrangement actuating means for exerting a braking force, when desired, by the rotors of the hydraulic torque converter for counteracting the tendency of a vehicle, in which the transmission may be installed, from attaining excessive speed when descending a steep hill.

Another object is to provide a hydraulic torque converter transmission of the foregoing character to include arrangement of the rotor elements for attaining a degree of torque multiplication automatically at greater speeds beyond the initial point of changeover from vortex to rotary flow of the motive fluid, than attained from conventional torque converter transmissions, for providing a quick step up of speed to a vehicle upon sharp acceleration of the engine such as the need for which occurs in traffic for passing another vehicle.

Another object is to provide a hydraulic torque converter transmission of the foregoing character wherein the combined guide and secondary runner rotor is provided with vanes having their lead-in portion curved to incline somewhat backward, relative to the forward direction of impeller rotation, so that during rotary flow phase of motive fluid action, the concave surface of the vane lead-in portions tend to grip or hook, so to speak, the fluid stream for driving the combination guide and secondary runner rotor more efficienly than would be the case if these vane lead-in portions were curved to incline oppositely so as to then require the motive fluid to impinge on a convex surface which would result in considerable slip during this action.

Another object is to provide a hydraulic torque converter transmission of the foregoing character wherein a unidirectional clutch is provided for preventing the planet pinion carrier from overrunning the power input shaft coupled to the engine which thereby upon de-acceleration causes a relative step up speed to the primary runner to function temporarily as the impeller for providing automatically a limited braking effect when a vehicle is coasting or to enhance the turning of the engine when necessary to push or tow a vehicle to a start.

Another object is to provide a hydraulic torque converter transmission wherein an internal ring gear is provided to mesh with planet pinions of the planetary gear set together with braking means applicable to halt this ring gear for causing clockwise rotation of a runner rotor and likewise the guide rotor, but at a relatively substantially reduced speed for action of these rotors as a hydraulic brake when the output shaft becomes temporarily the driving member upon a vehicle descending an incline.

Another object is to provide a hydraulic torque converter transmission wherein positive mechanical clutching means are provided to drivingly connect a transmission output shaft with the elements of a planetary gear set for selectively attaining either forward or reverse drive.

Still another object is to provide a hydraulic torque converter transmission wherein positive mechanical means are provided selectively engageable for locking a transmission output shaft stationary to prevent a vehicle from rolling when parked on an incline.

To those skilled in the art the foregoing objects together with other features disclosed herein will be apparent from the following description and by reference to the accompanying drawings in which:

Figure 1 is a central vertical section of a hydraulic torque converter transmission according to one form of the present invention.

Figure 2 is a vertical cross section along the line 2—2 in Figure 1 showing a frontal view of the hydraulic torque converter case together with a sectional view through the unidirectional clutch associated with the power input shaft and the planet pinion carrier.

Figure 3 is a fragmentary section along the line 3—3 in Figure 2 showing the contour of the various rotor vanes at their inward portions relative to the axis of the rotors.

Figure 4 is a fragmentary section along the line 4—4 in Figure 2 showing the contour of the various rotor vanes at their outward portions relative to the axis of the rotors.

Figure 5 is a vertical cross section along the line 5—5 in Figure 1 showing the planetary gear set with a portion thereof broken away to reveal a rearward planet pinion.

Figure 6 is a cross section along the line 6—6 in Figure 1 showing the unidirectional clutch of a unidirectional braking unit associated with a planet pinion carrier and a guide and secondary runner rotor.

Figure 7 is a vertical cross section along the line 7—7 in Figure 1 showing clutching elements and their shifting mechanism associated with a transmission output shaft and elements of the planetary gear set.

Figure 8 is a central vertical section through a modification of Figure 1, wherein the unidirectional braking unit associated with the planet pinion carrier has been eliminated and instead a similar braking unit is provided for coacting association with the idling sun gear.

Figure 9 is a fragmentary cross section along the line 9—9 of Figure 8 showing the unidirectional clutch elements of the unidirectional braking unit.

Figure 10 is a central vertical section of another modification of Figure 1, wherein the planetary gear set has been modified so as to provide both forward and reverse drive through the output sun gear and the addition of a ring gear together with a brake associated therewith for controlling the operation of the rotors to act as a hydraulic brake.

*Hydraulic torque converter transmission—First form*

Referring to the drawings in detail, Figures 1 to 7 inclusive show a hydraulic torque converter transmission generally designated 11, according to a first form of the invention as consisting of a hydraulic torque converter 12 combined with a planetary gear set 13. All of these mechanisms are enclosed in a housing 14 which in turn consists of a bell-shaped hydraulic torque converter housing portion 15 bolted as at 16 to the forward end of a gearing housing portion 17 closed at its rearward end and bolted thereto as at 18 is a transmission output shaft housing 19 (in partial view Figure 1).

Drivingly connected to the hydraulic torque converter 12 is a power input shaft 20 (Figure 1) bolted as at 21, connecting the flanged portion 22 of shaft 20 to a hydraulic torque converter forward casing half 23 having adjacent the periphery thereof a stepped shoulder 24 on which the ring gear 25 is mounted for engagement by a pinion of a conventional electric starting motor (not shown) for starting an engine to which the power input shaft 20 may be connected. Bolted to the forward casing half 23 as at 26 is the hydraulic torque converter rearward casing half 27 extending rearwardly to form an end portion with a wall 28 supporting vanes 29 which in turn support a split annular guide ring 30 for guidance of the motive fluid. The wall 28 together with the vanes 29 and the split annular guide ring 30 form the impeller rotor 31 of the hydraulic torque converter 12. The wall 28 terminates centrally into a hub 32 having an extended sleeve-like portion 33 bushed in its bore as at 34. Inward end portions 35 (Figure 3) of the vanes 29 of the impeller rotor 31 are curved to incline forward relative to the forward or clockwise rotation of the impeller rotor (indicated by direction arrows in Figures 2, 3, and 4) and thence, these vanes extend substantially radial to their outward ends (Figure 3).

Rotatably mounted through the bushed impeller rotor hub 32 is a hollow primary runner rotor shaft 36 bushed in its bore as at 37, 38, and 39. This hollow shaft 36 (Figure 1) has at its forward end an exteriorly splined portion 40 and drivingly mounted thereon is a correspondingly splined hub 41 held to assembly by a snap ring 42 seated in a corresponding groove of shaft 36. The splined hub 41 forms the central portion of the primary runner rotor 43 consisting of two series of vanes spaced apart by the split annular guide rings 44 and 45 which in turn are separated and supported by the web 46 and, the guide ring 44 supports an outer series of vanes 47 which are enclosed at the periphery of the rotor 43 by an annular wall 48 thus forming a path for the motive fluid therebetween and likewise provided by the inward series of vanes 49 positioned between the split annular guide ring 45 and the hub 41. The vanes 47 of the outward series are curved (Figures 2 and 4) and incline at both their lead-in portion 50 and their lead-out portion 51 in a backward direction while the vanes 49 of the inward series (Figures 1 and 3) have a slightly curved lead-in portion 52 including backward and thence extending to a lead-out portion 53 inclined forward relative to the direction of the impeller rotor rotation. Arrows associated with the rotor 43 (Figures 3 and 4) indicate direction of rotation.

Also rotatably mounted, the combined guide and secondary runner rotor 54 is positioned to act between the outward and inward series of primary runner rotor vanes 47 and 49. This rotor 54 consists of a dishedlike wall 55 supporting a series of vanes 56 which in turn support a split annular guide ring 57 for guidance of the motive fluid therebetween. The vanes 56 intermediate of their length extend substantially radially thence curving to incline forward at their inward end portion 58 (Figures 2 and 3) while at their outward end portion 59 are inclined backward relative to the direction of impeller rotation. The wall 55 of the rotor 54 is supported by hub 60 which is internally splined as at 61 and drivingly mounted on the correspondingly splined portion 62 of the shaft 63 of the combined guide and secondary runner rotor 54. The shaft 63 in turn is rotatably mounted through the bushed portions 37, 38, and 39 of the hollow shaft 36. On the forward end of the shaft 63 the inner race of the anti-friction bearing 64 is mounted and held to assembly thereon by snap ring 65 seated in a corresponding groove of shaft 63, the outer race of bearing 64 being mounted in recess 66 provided in the rearward end of the power input shaft 20.

Positioned to act between the power input shaft 20 and the guide and secondary runner rotor shaft 63 is the unidirectional clutch 67 (Figures 1 and 2) of the conventional sprag type, the outer race of which is provided by the recess 68 in the annular boss 69 of the torque converter forward casing half 23, the inner race of the clutch 67 being provided by the stepped diameter 70 of hub 60 of rotor 54. In the space extending circumferentially between the inner and outer races, the sprags 71 are assembled therein and held endwise to position by retaining ring 72. The sprags are inclined so as to wedge against the outer and inner races when shaft 63 tends to overrun shaft 20 causing these shafts to then act together, however, releasing the action when shaft 20 overruns shaft 63.

Forming the forward wall of the gearing housing 17 is the partition portion 73 of the hydraulic torque converter housing 15. The partition 73 at its central portion has an annular boss 74 which is provided with recess 75 and mounted therein is the bearing retainer ring 76 bolted as at 77. This retainer 76 has a recess 78 for receiving oil seal 79 engaging the periphery of the sleevelike portion 33 for preventing leakage of oil from the gearing housing. The retainer ring 76 holds to assembly the outer race of the anti-friction bearing 80, the inner race thereof is mounted on the hollow primary runner rotor shaft 36 and held to assembly thereon by snap ring 81 seated in a corresponding groove of this shaft.

Rotatably mounted on the hollow shaft 36 (Figures 1 and 5) is the bushed hub 82 of the combination brake drum and sun gear member 83. The brake means include the brake drum portion 84 which is connected by a web 85 to the hub 82, and the brake lining 86, which encircles the drum 84 and is secured to the band 87 of the brake 88. The brake band 87 is made selectively applicable by any well known and conventional brake actuating means for restraining from rotation or upon release of this brake permitting rotation of the brake drum and sun gear member 83. Encircling the hollow shaft 36 are thrust washers 89 and 90, the thrust washer 89 being positioned at the forward end of hub 82 and at the rearward end thereof is washer 90. At the rearward end of hub 82 is formed the forward or idling sun gear member 91 of the planetary gear set 13. The intermediate or input sun gear 92 is formed at the rearward end of the hollow primary runner rotor shaft 36 and the rearward or output sun gear 93 is formed at the forward end of a hollow shaft 94 which is bushed as at 95 and 96 for rotatable mounting on the rearward portion 97 of the guide and secondary runner rotor shaft 63.

Referring again to the planetary gear set 13 (Figures 1 and 5) in detail, orbitally mounted around the sun gears are planet pinion units 98 preferably spaced 120 degrees apart and each of these units comprise individual pinion gears 99, 100, and 101 arranged to mesh respectively with the sun gears 91, 92, and 93. These planet pinion units 98 are bored and bushed as at 102 and 103 for rotatably mounting on planet pinion axles 104 which in turn are supported in corresponding holes of the forward planet pinion carrier member 105 and likewise of the rearward planet pinion carrier member 106 which has a sleeve portion 107 extending rearwardly and bushed as at 108 for rotatable support on the hollow rearward sun gear shaft 94. The planet pinion carrier members 105 and 106 are bolted as at 109 to the flanged member 110 which is formed integral and in driving connection with the guide and secondary runner rotor shaft 63. The planet pinion carrier members 105 and 106 together with the flange member 110 form the planet pinion carrier assembly 111 and these members are notched out as at 112 (Figure 5) for clearance of the planet pinion units 98. Encircling the pinion axles 104 are thrust washers 113 and 114, washer 113 being positioned at the forward end of the planet pinion units 98 and at the rearward end thereof is washer 114. The thrust washer 115 encircles the shaft portion 97 and positioned at the forward end of sun gear 93 while at the rearward end thereof is thrust washer 115a encircling shaft 94.

The unidirectional braking unit designated 116 (Figure 1) has a bored hub portion 117 bushed as at 118 and 119 for rotatable support on the sleeve portion 107 of the rearward planet pinion carrier member 106. Encircling this sleeve portion 107 are thrust washers 120 and 121, washer 120 being positioned at the forward end of hub 117 and at the rearward end thereof is washer 121 held to position in groove 122 of sleeve 107 by snap ring 123. The bored hub portion 117 has an internal groove with its circumferential surface forming the outer race 124 of a sprag type clutch 125 with the inner race 126 thereof provided by the periphery of sleeve portion 107. In the space extending circumferentially between the outer and inward races, sprags 127 are assembled (Figure 6) and inclined so as to wedge against the outer race 124 and inward race 126 to thus cause the planet pinion carrier assembly 111 and the unidirectional braking unit 116 to act in unison when the combined guide and secondary runner rotor 54 and the planet pinion carrier assembly 111 coupled together tend to backwheel. These sprags 127 by reason of their inclined position release from their wedging action against the outer and inner races 124 and 126 respectively, upon forward or clockwise rotation of the planet pinion carrier assembly then acting independent of the braking unit 116.

The bored hub portion 117 of the unidirectional braking unit 116 is connected by a web 128 to a brake drum 129 which is encircled by brake lining 130 of a brake band 131 forming the brake 132 (conventional actuating mechanism not shown) selectively applicable for restraining the unidirectional braking unit 116 from rotating but, however, through the action of the unidirectional sprag type clutch 125 permitting the planet pinion carrier assembly 111 and the combined guide and secondary runner rotor shaft 54 to freely rotate forwardly or clockwise during rotary flow of the motive fluid in this phase of forward drive propulsion.

For selectively transmitting reverse or counterclockwise drive rotation from the planetary gear set 13 (Figures 1 and 7) the rearward planet pinion carrier member 106 at the rearward end of its sleeve portion 107 has formed circumferentially a series of clutch teeth 133 for engagement by internally formed clutch teeth 134 at the forward end of a clutch shifter sleeve 135 internally splined as at 136 for mounting drivingly and slidable on the correspondingly splined portion 137 of the transmission output shaft 138.

For selectively driving the transmission output shaft in a forward or clockwise direction (Figures 1 and 7) the internally formed clutch teeth 134 are also made engageable with clutch teeth 139 formed in the clutch collar 140 which is internally splined as at 141 and drivingly mounted on a correspondingly splined end portion of the hollow output sun gear shaft 94 and held to assembly by snap ring 142 seated in a corresponding groove of this shaft.

For selectively locking the transmission output shaft stationary, the clutch shifter sleeve 134 (Figures 1 and 7) has externally formed clutch teeth 143 for engagement with internally formed clutch teeth 144 in the locking plate 145 held stationary by bolting as at 18 to the gearing housing 17. The transmission output shaft 138 is bored and bushed as at 146 for rotatable support therein of the rearward portion 97 of the guide and secondary runner rotor shaft 63. The inner race of an anti-friction bearing 147 in turn supports the transmission output shaft 138 and this inner race is held to assembly on the shaft by snap ring 148 seated in a corresponding groove of this shaft while the outer race of bearing 147 is mounted in an annular recess 149 formed in the housing 19 and held to assembly therein by snap ring 150 seated in a corresponding groove of this recess.

The clutch shifter sleeve 135 has a groove 151 for engagement therein of shifter fork 152 having a bored and keyway slotted boss 153 mounted to slide on shaft 154 (Figure 7) provided with a key 155 to hold the shifter fork 152 to radial alignment thereon. The boss 153 also is grooved as at 156 for engagement by a squared head 157 of stud 158 mounted in a corresponding bored hole of lever 159 having a shaft 160 extending through a corresponding hole in boss 161 of the side plate 162 bolted as at 163 to the gear housing 17. An actuating lever 164 is fixedly mounted to the shaft 160 and held to assembly by nut 165 threaded on the end of this shaft as at 166.

It will be understood that conventional synchronizers may be employed in conjunction with the toothed clutching arrangement for selectively coupling the aforementioned elements of the planetary gear set with the transmission output shaft to provide either forward or reverse drive. These synchronizers usually include preliminary engaging conical clutching members to approximately synchronize the speed of the members to be clutched together for providing smoother engagement of the clutch teeth and are well known in automotive engineering practice of transmission construction and their details form no part of the present invention.

*Operation of the first form of hydraulic torque converter transmission*

In operation of the first form of the torque converter transmission shown in Figures 1 to 7 inclusive let it be assumed, that the power input shaft 20 is coupled to an internal combustion engine of an automotive vehicle and that oil or motive fluid is provided for operation of the hydraulic torque converter 12, the engine is idling and the clutch shifter sleeve 135 is positioned so that the internally formed clutch teeth 134 thereof are between clutch teeth 133 associated with the rearward planet pinion carrier member 106 and the clutch teeth 139 associated by hollow shaft 94 with the sun gear 93, or more specifically, the clutch shifter sleeve 135 being in neutral position and, the brakes 88 and 132 being in released position.

From the just-mentioned operating arrangement to attain forward drive, while the engine is idling and the impeller rotor 31 likewise rotating clockwise acting to a limited extent on the motive fluid, the clutch shifting sleeve 135 is shifted rearwardly engaging clutch teeth 134 with clutch teeth 139 thus drivingly coupling sun gear 93 and the transmission output shaft 138. At this stage of operation, the primary runner rotor 43 and the input sun gear 92 coupled together are free to rotate in a direction common with the impeller rotor rotation while the planet pinion carrier assembly 111 and the combination guide and secondary runner rotor 54 coupled together are caused to rotate reversely or counterclockwise following nearly, or substantially so, this rotor's natural tendency of counterclockwise rotation by the initial action of the motive fluid in vortex flow together, in conjunction, with the clockwise driving action transmitted by the primary runner rotor 43 to the input sun gear 92 drivingly rotates the planet pinions 100 together with planet pinions 101 which in turn are caused to roll, in a counterclockwise direction, around the output sun gear 93 being stalled due to the load impressed on the transmission output shaft 138 in starting up. Therefore, the limited driving force exerted by the rotor elements of the hydraulic torque converter 12, during this phase of operation, is substantially dissipated in this way by one motion canceling out another or nearly so, however, an appreciable amount of driving force remains for tooth hunting to engage the clutch teeth 134.

Following the engaging of clutch teeth 134 with the teeth 139, upon brake 132 being applied, the unidirectional braking unit 116 is halted thus, by action of the unidirectional clutch 125 thereof, the planet pinion carrier assembly 111 and the combined guide and secondary runner rotor 54 coupled together are restrained from rotating counterclockwise so now the driving force of the motive fluid is transmitted by the primary runner rotor 43 to the sun gear 92 to in turn, through planet pinions 100 and 101, drive sun gear 93 for forward or clockwise propulsion of the transmission output shaft 138 in a straight gearing reduction ratio through the planetary gear set 13 temporarily.

In the foregoing operation of the planetary gear set 13, let it be assumed, the driving sun gear 92 has twenty-five teeth, the driven planet pinions 100 twenty-six teeth each, the driving planet pinions 101 twenty-one teeth each and the driven sun gear 93 thirty teeth, therefore, when computed the reduction ratio equals 1.485 as the number of forward revolutions of the input sun gear 92 to 1.00 forward revolution of the output sun gear 93 when the planet pinion carrier assembly 111 is held stationary. However, the gearing ratio just described may be altered and other gearing proportions substituted without departing from the scope of this invention.

Upon acceleration of the engine, the vaned impeller rotor 31 likewise is caused to rotate faster clockwise and coincidentally exerting the motive fluid in a progressively stronger flow outwardly by centrifugal force and being guided between wall 28, the split annular guide ring 30 and the vanes 29 which exert the force to impinge the fluid stream passing from these vanes against the concave surfaces of the outward series of vanes 47 of the primary runner rotor 43 causing this rotor to also rotate clockwise but initially at considerably less speed than the impeller rotor due to the heavy load impressed on the transmission output shaft in starting up. This difference of rotor speed forces the motive fluid in predominately vortex flow with the fluid stream now being deflected somewhat in a rearward direction, relative to forward impeller rotation, by the curved vanes 47, thence, in passing therefrom the fluid stream impinges against the convex surface of the outward end portion 59 of vanes 56 and continuing impingement along the forward faces of vanes 56 of the combination guide and secondary runner rotor 54. This action tends to rotate this rotor 54 in a counterclockwise direction but is prevented from doing so by the action of the unidirectional braking unit 116 thus causing these rotor vanes 56 to act as reaction elements to further exert driving force to the vanes of the primary runner rotor 43 during this phase of operation.

In passing from the vanes 56 of the combined guide and secondary runner rotor 54, the fluid stream thence is deflected in a forward direction by the inward end portion 58 (Figure 3) of vanes 56 so as to impinge the motive fluid against the concave surface of the lead-in portion 52 of vanes 49 and continuing impingement along the rearward faces of the inward series of vanes 49, thence, the inclined lead-out portion 53 of these vanes 49 guides the fluid stream forwardly while passing therefrom for easement of pick-up by the forwardly inclined inward end portion 35 of the impeller rotor vanes 29 which drivingly exert the force to continuously recirculate the motive fluid during the predominately vortex flow phase of operation.

As will be observed from the foregoing, considerable torque multiplication is derived from the vanes 56 of the combination guide and secondary runner rotor 34 acting between the two series of vanes 47 and 49 of the primary runner rotor 43. This torque multiplication is further widened automatically, through the gearing, and developed responsively to the loads impressed on the transmission output shaft 138 by the coaction and coupling of rotors 43 and 54 respectively with the planetary gear set elements 92 and 111.

While the engine is accelerated more power is developed and together with the torque multiplication derived from the hydraulic torque converter 12 combined coactingly with the gearing reduction ratio through the planetary gear set 13 overcomes the load impressed on the transmission output shaft 138. As the speed of the engine increases, the primary runner rotor 43 is caused to rotate faster and faster in a phase of catching up with the impeller rotor 31, in consequence, at a point during this phase of operation, the motive fluid changes its action from predominately vortex flow to exert its force now in predominately rotary flow in a direction common with the impeller rotor rotation, in so doing, the motive fluid is caused to exert its force on the opposite or rearward faces of vanes 56 of the guide and secondary runner rotor 54, which in turn, together with the planet pinion carrier assembly 111 coupled therewith, catches up with the primary runner rotor 43 coupled to the sun gear 92.

As these just-mentioned elements all attain nearly equal speed, the planetary action resulting thereby diminishes the gearing reduction ratio of the planetary gear set 13 with correspondingly diminishing speed of the planet pinions on their axles 104, thus causing the planetary gear set 13 to ultimately rotate substantially as a unit to provide nearly a direct drive ratio of 1 to 1 between the power input shaft 20 and the transmission output shaft 138 during forward drive operation.

In forward speeds considerably beyond the initial point of changeover from vortex to rotary flow influence a degree of torque multiplication is still attainable by merely sharply accelerating the engine. This operating feature is provided by the arrangement of the elements embodied in the present invention, whereby, the output torque or load impressed on the transmission output shaft 138 is distributed by the planetary gear set 13 and assumed proportionately, relative to the gearing ratio, between the primary runner rotor 43 coupled to the sun gear 92 and the combined guide and secondary runner rotor 54 coupled to the planet pinion carrier assembly 111. This relative proportioning in accordance with the assumed gearing ratio aforementioned herein divides the torque so that the vanes 47 and 49 of the primary runner rotor 43 assume approximately two-thirds of the total torque and the vanes 56 of the combined guide and secondary runner rotor 54 the remaining one-third.

Since the primary runner rotor 43 assumes only a relative proportion of the total torque and that proportion is further divided between the outward and inward series of vanes 47 and 49 of this rotor, consequently, when a sudden step up of speed is exerted on the fluid stream by the vanes 29 of the impeller rotor 31, caused through sharp acceleration of the engine, the motive fluid must necessarily first act drivingly on the outer series of vanes 47 of the primary runner rotor 43, and as these vanes 47 are of a proportion to assume substantially less than the total torque output this primary runner rotor 43 momentarily lags behind the impeller rotor 31, and the combined guide and secondary runner rotor 54 lags behind the primary runner rotor 43 thereby developing torque multiplication automatically by the action of the rotors which is further increased by the planetary action of the planetary gear set 13 resulting from the differential speed between the sun gear 92 and the planet pinion carried assembly 111 coupled respectively to rotors 43 and 54.

To reverse the drive of the transmission output shaft 138, the brake 132 is released permitting reverse or counterclockwise rotation of the combined guide and secondary runner rotor 54 and therewith the planet pinion carrier assembly 111, the internally formed clutch teeth 134 of the clutch shifter sleeve 135 shifted forwardly in engagement with teeth 133 of the sleeve portion 107 of the planet pinion carrier assembly 111, thereby clutching the planet pinion carrier assembly 111 with the transmission output shaft 138. At this stage of operation, the combined guide and secondary runner rotor 54 and therewith the planet pinion carrier assembly 111 are held from rotating by the stalled transmission output shaft 138 due to the load impressed thereon in starting up, however, the primary runner rotor 43 and the sun gear 92 are free to rotate with the impeller rotor 31, thus substantially dissipating the limited driving force of the motive fluid during this phase of operation. This direction of the forces exerted by the motive fluid permits engagement of the clutch teeth 133 and 134 without undue clashing while the engine is idling.

The internally formed clutch teeth 134 being engaged with the clutch teeth 133 to provide reverse drive propulsion of the transmission output shaft 138, the brake 88 applied halts the sun gear 91. Assuming this sun gear 91 has thirty-six teeth and meshing therewith the planet pinions 99 fifteen teeth each and the aforementioned assumed gearing proportion of the input sun gear 92 with twenty-five teeth driving the planet pinion 100 having twenty-six teeth, thus, it will be observed the sun gear 91 is larger in tooth proportion than the input sun gear 92 coupled to the primary runner rotor 43. During this reverse drive operation, the output gear 93 being disengaged together with its hollow-shaft 94 idles on shaft portion 97.

When the sun gear 91 is held stationary, the input sun gear 92 being drivingly rotated clockwise, by the primary runner rotor 43, in turn, drives the planet pinions 100 and therewith planet pinions 99, which being meshed with the halted sun gear 91 are drivingly rolled around thereon in a counterclockwise direction thereby transmitting force through the planet pinion axles 104 to drive the planet pinion carrier assembly 111 and the transmission output shaft 138 clutched together counterclockwise at a reduction, relative to the speed of the input sun gear 92, by the planetary action and gearing proportions as aforementioned which upon computing results in 1.496 as being the forward driving revolutions of the input sun gear 92 to 1.000 reverse or counterclockwise revolution of the planet pinion carrier assembly 111 and the transmission output shaft 138 during reverse drive operation.

While the planet pinion carrier assembly 111 is caused to rotate counterclockwise, the combined guide and secondary runner rotor 54 coupled therewith must likewise rotate counterclockwise. As the vanes 47 and 49 of the primary runner rotor 43 are of a proportion to assume less than the total torque in relation to the force exerted on the motive fluid by the vanes 29 of the impeller rotor 31, the primary runner rotor 43, due to the load impressed on the transmission output shaft 138, lags behind the speed of the impeller rotor 31, and thus, cooperatively with the combined guide and secondary runner rotor 54 in counterclockwise rotation directs the motive fluid in vortex flow, in so doing, the curved vanes 47 of the primary runner rotor 43 deflect the fluid stream rearwardly to impinge on the forward surface of the vanes 56 of the combined guide and secondary runner rotor 54 exerting a force thereon drivingly counterclockwise and transmitted to the planetary gear set 13 to combine therewith the force exerted by the primary runner rotor 43 to drive reversely the planet pinion carrier assembly 111 and the transmission output shaft 138 clutched thereto.

The foregoing action obtained from halting the sun gear 91 may be utilized for forward drive to attain a greater reduction ratio through the planetary gear set 13 than results from merely halting the planet pinion carrier assembly 111. In this forward drive operation, the application of brake 88 and release of brake 132 is the same, as for reverse drive, together with the action of the rotors, however, the transmission output shaft 138 being clutched to the output sun gear 93 instead of the planet pinion carrier assembly 111. In this operation by the planetary action and the aforementioned gearing proportions, upon computing, results in 2.20 as the forward driving revolutions of the input sun gear 92 to 1.00 forward revolution of the output sun gear 93 clutched to the transmission output shaft 138.

The action derived from halting the sun gear 91 may be further utilized to obtain braking effect upon a vehicle descending a steep hill. For this operation, brake 132 is released and brake 88 is applied. The weight of the vehicle descending the plane causes the wheels thereof to drive the transmission output shaft 138 clutched to the output sun gear 93, as for forward drive, in turn, through the planetary gear set 13, drives the primary runner rotor 43 clockwise at a step up speed while the combined guide and secondary runner rotor 54 is rotated counterclockwise for action of these rotors as a hydraulic brake.

The unidirectional clutch 67 acts automatically to prevent the planet pinion carrier assembly 111 from overrunning the power input shaft 20 when the engine is deaccelerated or stalled with the drive then coming from the wheels of the vehicle, such as occurs, upon descending an incline, or, the vehicle pushed to start the engine in event of a dead battery. In this action, the drive is transmitted by the transmission output shaft 138 through the planetary gear set 13 now acting reversely to its normal gearing reduction function so as to cause a step up speed to the primary runner rotor 43 for action temporarily as an impeller coacting with the other rotors and the engine to impart braking effort, or enhance the starting of the engine when pushing the vehicle, thereby, reducing the speed necessary for doing so than would be required if this unidirectional clutching device 67 were not employed.

To prevent a vehicle from rolling particularly when parking on an incline, the clutch shifting sleeve 135 is shifted rearwardly to engage clutch teeth 143 with teeth 144 of the stationary locking plate 145 thus locking the transmission output shaft 138 stationary and therewith at least two of the vehicle's wheels which, in customary automotive practice, are in permanent driving connection with a transmission output shaft.

Furthermore, hydraulic operated clutches together with intricate control mechanisms to provide output drive rotation, as employed in conventional hydraulic torque converter transmissions, may be dispensed with when utilizing the present transmission arrangement.

Among the advantages derived from the features of my foregoing described arrangements, the feature whereby a degree of torque multiplication automatically is available beyond the initial speed of changeover from vortex to rotary flow influence provides the necessary action for power development by torque multiplication so as to permit the use of a smaller engine of lesser horsepower than required for conventional hydraulic torque converter transmissions to meet equivalent performance, since by acceleration under load, to attain a higher speed quickly from a lower speed more power is needed than required to maintain that higher speed.

*Hydraulic torque converter transmission—Second form*

The modified hydraulic torque converter transmission, generally designated 167, shown in Figures 8 and 9 is generally similar in construction to that shown in Figures 1 to 7 inclusive, and similar parts are similarly designated. In the modification of Figure 8, the unidirectional braking device associated with the planet pinion carrier assembly 111 has been eliminated and instead a similar unidirectional braking unit 168 has been positioned for association with the modified combination sun gear and brake drum member 169 of Figure 8.

The unidirectional braking unit 168 comprises a brake drum 170 encircled by brake lining 171 secured to brake band 172 forming brake 173 applicable to halt the braking unit 168. The brake drum 170 is supported by web 174 joined with hub 175 which is bored and bushed as at 176 and 177 for rotatable support on the hub 178 of the member 169. The hub 175 is internally grooved at its bore and the grooved circumferential surface forms the outer race 179 of a sprag type unidirectional clutch 180 with the inclined sprags 181 assembled (Figures 8 and 9) in the groove of hub 175 and the inner race 182 of clutch 180 is formed by the periphery of the forward portion of hub 178 of the combination sun gear and brake drum member 169.

The hub 178 is bored and bushed as at 183 for rotatable support on the hollow primary runner rotor shaft 36. Intermediate of the length of hub 178 a web 183A is joined thereto for support of brake drum 184 which is encircled by brake lining 185 secured to brake band 186 forming brake 187 made applicable to halt sun gear 91 formed at the rearward portion of hub 178. Thrust washer 188 encircles hub 178 and positioned at the rearward end of hub 175.

The operation of the modified transmission shown in Figures 8 and 9 is generally similar to that of the first form of Figures 1 to 7 inclusive. For forward drive, the transmission output shaft 138 is similarly clutched to the sun gear 93, however, to complete the step to attain forward drive, from the transmission of this second form, brake 173 is applied thus halting the unidirectional braking unit 168 to restrain in turn, by the wedging action of the inclined sprags 181 of the undirectional clutch 180 against the outer and inner races thereof, the sun gear 91 from rotating counterclockwise which would otherwise occur if permitted to follow its natural tendency to do so because of the reaction transmitted to this larger sun gear 91 by the planet pinion units 98 with their pinions 101 attempting to roll counterclockwise around the sun gear 93 due to the load impressed on the transmission output shaft 138 and the driving action of sun gear 92 coupled to the primary runner rotor 43. By this action, the pinion gears 99 roll counterclockwise around the halted sun gear 91 causing the planet pinions 101 to drivingly rotate the output sun gear 93 clockwise at a considerable reduction, by the planetary action and the aforementioned assumed gearing proportions, when computed results in 2.20 as the clockwise revolutions of the input sun gear 92 to 1.00 clockwise or forward revolution of the output sun gear 93 occurring when the motive fluid is predominately in vortex flow rotating the primary runner rotor 43 clockwise while the combination guide and secondary runner rotor 54 is rotated counterclockwise.

While more power is developed by accelerating the engine, the load on the transmission output shaft 138 is progressively overcome to the point where the force exerted by the motive fluid changes from vortex flow to predominately rotary flow and simultaneously therewith the wedging action of the inclined sprags 181 of clutch 180 are released as the combination guide and secondary runner rotor 54 coupled to the planet pinion carrier assembly 111 is then drivingly rotated clockwise in a phase whereby the rotor elements and the input and output members of the planetary gear set 13 attain nearly equal speed during forward drive operation.

For reverse drive operation, the transmission output shaft 138 is clutched to the planet pinion carrier assembly 111 and the brake 187 applied to halt sun gear 91, consequently, the action from the rotor elements and the members of the planetary gear set 13 is similar to that of the first form of Figures 1 to 7 during this operation.

*Hydraulic torque converter transmission—Third form*

The modified hydraulic torque converter transmission designated 189 shown in Figure 10 is generally similar in construction to that shown in Figures 1 to 7 inclusive, and similar parts are similarly designated. In the modification of Figure 10, however, the planetary gear set designated 190 is modified to provide both forward and reverse drive from the output sun gear 93 and, a combination ring gear and brake drum member 191 has been added together with a brake 192 made selectively applicable to halt this member 191 for controlling operation of the rotor elements to act as a hydraulic brake.

The combination ring gear and brake drum member 191 has a brake drum portion 193 which is encircled by brake lining 194 secured to a brake band 195 forming the brake 192. Forwardly of the member 191 is a brake drum 196 encircled by brake lining 197 secured to brake band 198 forming brake 199. The brake drum 196 is connected by web 200 to a hub 201 internally splined as at 202 mounted on the correspondingly splined portion of the stepped hollow shaft 203 bushed as at 203a and has formed at its rearward portion the forward or idling sun gear 204. An intermediate or input sun gear 205 is formed at the rearward portion of the hollow primary runner rotor shaft 36. A rearward or output sun gear 206 is formed at the forward portion of the hollow shaft 94. Orbitally mounted around the sun gears are planet pinion units 207 preferably spaced at intervals of 120 degrees and each of these units comprise individual planet pinions 208, 209 and 210 arranged to mesh respectively with the sun gears 204, 205 and 206. Formed integrally with the brake drum 193 is an internally toothed ring gear 211, shown in the form of Figure 10, meshing with planet pinions 208, however, this ring gear may be arranged to mesh with another row of planet pinions without departing from the scope of this invention.

The planet pinion units 207 of this third form are similarly rotatably mounted, as in the first form of Figures 1 to 7, on planet pinion axles 104 which in turn, are supported by the forward and rearward planet pinion carrier members 105 and 106, however the rearward planet pinion carrier member 106, in the modification of Figure 10, has the clutch teeth omitted from the sleeve portion 107 since, in this third form, both forward and reverse drive is transmitted by the output sun gear 206 clutched to the transmission output shaft 138 upon engagement of the internal splines 136 of the shifter sleeve 218 with teeth 139 of the clutch collar 140.

Thrust washers 212 and 213 encircle the shaft 203 and positioned respectively at the forward and rearward ends of hub 214 bored and bushed as at 215 for rotatable mounting on the shaft 203 and this hub 214 is joined by web 216 with the brake drum 193. Thrust washer 217 is positioned at the end of hub 117 and encircles the clutch collar 140.

The clutch shifter sleeve designated 218 shown in Figure 10 is somewhat modified and shorter, than the shifter sleeve shown in the first form of Figure 1, because of its shorter travel and the elimination of clutching engagement with the planet pinion carrier assembly 111 of this third form of transmission.

It will be observed from an inspection of Figure 10 that in the modified form of the planetary gear set 190, particularly, in respect to the sun gears, the intermediate or input sun gear 205 is of the smallest pitch diameter, the forward or idling sun gear 204 is somewhat larger than sun gear 205 and, the rearward or output sun gear 206 is of the largest pitch diameter of the three sun gears.

The operation of this third form of hydraulic torque converter transmission shown in Figure 10 follows generally the operation of the first form of Figures 1 to 7 except as to the initial step, for obtaining reverse drive, wherein the transmission output shaft 138 of the third form is clutched, by the clutch shifter sleeve 218, to the output sun gear 206 as in forward drive. At this initial stage of operation, the force exerted on the motive fluid, by the idling engine, is substantially dissipated in the manner previously described for forward drive operation of the first form.

Forward drive is obtained, with the transmission output shaft 138 clutched to the output sun gear 206 with brakes 192 and 199 released and brake 132 applied, in a similar manner previously described herein for forward drive as from the first form of transmission shown in Figures 1 to 7.

Reverse drive is obtained with brakes 132 and 192 released permitting counterclockwise rotation of the planet pinion carrier assembly 111 and the guide and secondary runner rotor 54, the output sun gear 206 clutched to the transmission output shaft 138, brake 199 applied halting idling sun gear 204, consequently, causing the planet pinions 208 to roll on the halted sun gear 204 and in turn drivingly rotating the planet pinion carrier assembly 111 counterclockwise in planetary action causing the output sun gear 206 and the transmission output shaft 138 clutched together to be drivingly rotated reversely or counterclockwise by virtue of the sun gear 206 being of larger pitch diameter than sun gear 204 of this third form of transmission and by similar driving action of the rotor elements as previously described for reverse drive from the first form of transmission.

Braking effort is obtained for effectively counteracting the tendency of a vehicle, in forward drive, to coast down a steep incline at excessive speed by applying brake 192 to halt ring gear 211, thence, the drive coming from the wheels of the vehicle is transmitted to the planetary gear set 190 by sun gear 206 to in turn drive the planet pinion units 207 causing the particular planet pinions meshing with the ring gear 211 to roll thereon, resulting, in planetary action to rotate clockwise the primary runner rotor 43 coupled to the sun gear 205 at a step up speed and also rotating clockwise the combined guide and secondary runner rotor 54 coupled to the planet pinion carrier assembly 111 at a relative step down speed for action of these rotors as a hydraulic brake.

Having thus described my invention, I claim:

1. In combination, a hydraulic torque converter having an impeller rotor, a primary runner and a secondary runner coactingly coupled to elements of a planetary gear set, said primary runner coupled to a sun gear, said secondary runner coupled to a planet pinion carrier member of said gear set, another sun gear adaptable for idling, a third sun gear arranged to act as the driven output member of the planetary gear set, planet pinions rotatably supported by said planet pinion carrier and arranged for drivingly connecting the sun gears, braking means operative to halt said idling sun gear, an output shaft arranged for driving connection with the planetary gear set, clutching elements on said output shaft, additional corresponding clutching elements associated with the third sun gear and the planet pinion carrier, said clutching elements selectively engageable for drivingly coupling the output shaft either to the latter sun gear or to said planet pinion carrier.

2. In combination, a hydraulic torque converter having an impeller rotor, a primary runner and a secondary runner coactingly coupled to elements of a planetary gear set, said primary runner coupled to a sun gear, said secondary runner coupled to a planet pinion carrier member of said gear set, another sun gear adaptable for idling, a third sun gear arranged to act as the driven output member of the planetary gear set, planet pinions rotatably supported by said planet pinion carrier and arranged for drivingly connecting the sun gears, braking means operative to halt said idling sun gear, an output shaft arranged for driving connection with the planetary gear set, a stationary member, clutching elements on said shaft, additional correspondingly clutching elements on the planet pinion carrier and associated with the third sun gear and said stationary member, said clutching elements selectively engageable for either drivingly coupling the output shaft to the latter sun gear and to the planet pinion carrier or to lock said shaft to the stationary member.

3. In combination, an impeller rotor, a primary runner and a secondary runner coactingly coupled to elements of a planetary gear set, said primary runner drivingly coupled to a sun gear, said secondary runner drivingly coupled to a planet pinion carrier member of said gear set, another sun gear adaptable for idling, a third sun gear arranged to act as a driven output member of the planetary gear set, planet pinions rotatably supported by said planet pinion carrier and arranged for drivingly connecting the sun gears, said idling sun gear having a sleevelike hub, a brake element coupled to the hub, braking means applicable to said brake element for halting the idling sun gear so as to compel the planet pinion carrier and secondary runner to rotate in a direction reversely to the primary runner and the sun gear coupled together, a unidirectional brake arranged with one race thereof to act in unison with the idling sun gear and the other race of said unidirectional brake to act in unison with another brake element provided, additional braking means applicable to the latter brake element for making operative the unidirectional brake to prevent said idling sun gear from rotating reversely to the rotation of said primary runner and sun gear coupled together, said unidirectional brake releasable while the latter braking means are applied upon said runners being drivingly rotated in the same direction.

4. A transmission comprising, a hydraulic torque converter having an impeller rotor coupled to a power input member, a primary runner and a secondary runner coactingly coupled to elements of a planetary gear set, a casing member to enclose the impeller rotor and the runners for driving action on the motive fluid, an output shaft, said planetary gear set having a driven element rotating in the direction with the impeller and another driven element rotating reversely thereto, the primary runner mounted operatingly to always rotate in one direction for imparting a major portion of the driving torque, the secondary runner rotatably mounted responsive to the action of the motive fluid to impart the minor portion of the torque in either direction of rotation, means to clutch the output shaft to either of said driven elements of the planetary gear set.

5. A transmission comprising, a hydraulic torque converter having an impeller rotor coupled to a power input member, a primary runner and a secondary runner coactingly coupled to elements of a planetary gear set, a casing member to enclose the impeller rotor and the runners for driving action on the motive fluid, an output shaft adaptable to become a driving element, unidirectional clutching means coacting with the power input member to prevent the output shaft when acting as a driving element from overrunning said input member, said planetary gear set having a driven element rotating in the direction with the impeller rotor and another driven element rotating reversely thereto, the primary runner mounted operatingly to always rotate in one direction for imparting a major portion of the driving torque thereby the secondary runner rotatably mounted responsive to the action of the motive fluid to impart the minor portion of the torque in either direction of rotation, means to clutch the output shaft to either of said driven elements of the planetary gear set.

References Cited in the file of this patent

UNITED STATES PATENTS

| Number | Name | Date |
|---|---|---|
| 1,674,557 | Maybach | June 19, 1928 |
| 2,034,429 | De Lavaud | Mar. 17, 1936 |
| 2,136,419 | Duffield | Nov. 15, 1938 |
| 2,277,214 | Dodge | Mar. 24, 1942 |
| 2,316,390 | Bierman | Apr. 13, 1943 |
| 2,324,713 | McFarland | July 20, 1943 |
| 2,355,427 | Duffield | Aug. 8, 1944 |
| 2,371,574 | Swennes | Mar. 13, 1945 |
| 2,378,577 | Oldfield | June 19, 1945 |
| 2,416,129 | Swift | Feb. 18, 1947 |
| 2,453,877 | Trail | Nov. 16, 1948 |
| 2,456,328 | Schneider | Dec. 14, 1948 |
| 2,465,739 | McGill | Mar. 29, 1949 |
| 2,481,529 | Norelius | Sept. 13, 1949 |
| 2,514,963 | McRae | July 11, 1950 |
| 2,541,391 | Weiss et al. | Feb. 13, 1951 |
| 2,548,272 | Seybold | Apr. 10, 1951 |
| 2,549,125 | Paton | Apr. 17, 1951 |
| 2,550,082 | Orr | Apr. 24, 1951 |
| 2,575,522 | McFarland | Nov. 20, 1951 |
| 2,590,472 | Soper et al. | Mar. 25, 1952 |
| 2,609,708 | Burtnett | Sept. 9, 1952 |
| 2,618,174 | Clifton | Nov. 18, 1952 |
| 2,623,408 | Mayner | Dec. 30, 1952 |